(12) United States Patent
Kanno

(10) Patent No.: US 8,784,923 B2
(45) Date of Patent: Jul. 22, 2014

(54) RAW MATERIALS, METHODS AND FRUITS AND VEGETABLES PERTAINING TO SUGAR CONTENT IMPROVEMENT, SUGAR COMPONENT ADJUSTMENT, AND TASTES ADJUSTMENT

(76) Inventor: Minoru Kanno, Sendai (JP)

( * ) Notice: Subject to any disclaimer, the term of this patent is extended or adjusted under 35 U.S.C. 154(b) by 258 days.

(21) Appl. No.: 13/059,166

(22) PCT Filed: Aug. 18, 2009

(86) PCT No.: PCT/JP2009/064472
§ 371 (c)(1),
(2), (4) Date: Mar. 18, 2011

(87) PCT Pub. No.: WO2010/021330
PCT Pub. Date: Feb. 25, 2010

(65) Prior Publication Data
US 2011/0165312 A1    Jul. 7, 2011

(30) Foreign Application Priority Data

Aug. 19, 2008    (JP) .................................. 2008-211206

(51) Int. Cl.
| | | |
|---|---|---|
| A23B 7/00 | (2006.01) | |
| A23B 7/16 | (2006.01) | |
| A23B 7/154 | (2006.01) | |
| A23L 1/212 | (2006.01) | |
| A23L 1/22 | (2006.01) | |

(52) U.S. Cl.
CPC . *A23B 7/16* (2013.01); *A23B 7/154* (2013.01); *A23L 1/2123* (2013.01); *A23L 1/22091* (2013.01)
USPC ........................... 426/534; 426/639; 426/654

(58) Field of Classification Search
CPC ...... A23B 7/154; A23B 7/16; A23L 1/22091; A23L 1/2123; A23L 1/302
USPC ......................................... 426/639, 534, 654
See application file for complete search history.

(56) References Cited

U.S. PATENT DOCUMENTS

| | | | |
|---|---|---|---|
| 6,749,875 B2 * | 6/2004 | Selleck ...................... | 426/270 |
| 2003/0108593 A1 | 6/2003 | Oku et al. | |
| 2004/0131734 A1 * | 7/2004 | Petcavich ...................... | 426/268 |
| 2005/0065030 A1 | 3/2005 | Oku et al. | |
| 2005/0123671 A1 | 6/2005 | Oku et al. | |
| 2007/0218189 A1 | 9/2007 | Oku et al. | |

FOREIGN PATENT DOCUMENTS

| | | |
|---|---|---|
| EP | 0 983 727 A2 | 3/2000 |
| EP | 1 374 688 A1 | 1/2004 |
| JP | A-2000-037142 | 2/2000 |
| JP | A-2000-239454 | 9/2000 |
| JP | A-2002-345340 | 12/2002 |
| JP | A-2003-160495 | 6/2003 |
| JP | A-2004-073077 | 3/2004 |
| JP | A-2006-207046 | 8/2006 |
| JP | A-2008-079569 | 4/2008 |

OTHER PUBLICATIONS

Jul. 4, 2012 Office Action issued in Chinese Patent Application No. 200980132325.2 (with translation).
Morisawa et al., "Study on the Processing Technique of Paper and Non-Woven Cloth Using Processing Chemicals Originated from Natural Products," *The Report on Works of Kochi Prefectural Paper Technology Center*, vol. 10, pp. 21-31, Nov. 24, 2005 (With English-language Abstract).
International Preliminary Report on Patentability issued in Application No. PCT/JP2009/064472; Dated Mar. 8, 2011.
International Search Report issued in Application No. PCT/JP2009/064472; Dated Nov. 17, 2009 (With Translation).
Supplementary European Search Report dated Apr. 7, 2014 from European Patent Application No. 09808266.2.

\* cited by examiner

*Primary Examiner* — Jyoti Chawla
(74) *Attorney, Agent, or Firm* — Oliff PLC

(57) ABSTRACT

The present invention provides a sugar content-improving material that can prevent oxidative damage of fruits and vegetables after harvesting as well as can improve the sugar content, a method for improving the sugar content of fruits or vegetables, fruits or vegetables having an improved sugar content, a sugar component-adjusting material, a method for adjusting a sugar component of fruits and vegetables, fruits or vegetables having an adjusted sugar component, a taste-adjusting material, a method for adjusting the taste of fruits or vegetables, and fruits or vegetables having adjusted taste. The sugar content-improving material includes a breathable, permeable and flexible sheet containing proanthocyanidin and trehalose. The proanthocyanidin is contained in the sheet in a proportion of 250 to 300 mg/m². The trehalose is contained in the sheet in a proportion of 5 g/m².

10 Claims, 10 Drawing Sheets

Mean+Standard error (n=3)

Mean+Standard error (n=3)

RAW MATERIALS, METHODS AND FRUITS AND VEGETABLES PERTAINING TO SUGAR CONTENT IMPROVEMENT, SUGAR COMPONENT ADJUSTMENT, AND TASTES ADJUSTMENT

TECHNICAL FIELD

The present invention relates to a sugar content-improving material, a method for improving the sugar content of fruits or vegetables, fruits or vegetables having an improved sugar content, a sugar component-adjusting material, a method for adjusting a sugar component of fruits and vegetables, fruits and vegetables having an adjusted sugar component, a taste-adjusting material, a method for adjusting the taste of fruits or vegetables, and fruits or vegetables having adjusted taste.

BACKGROUND ART

As those for increasing the sugar content of fruit, there have hitherto been a fruit sugar content-increasing solution, which is a solution prepared by dissolving at least one of brown sugar, fructose, sucrose prepared by purifying sugar, and glucose in water, and is scattered on or added to the soil before the harvesting of fruit (see, for example, refer to JP-A-2002-345340), and a fruit bag including an ethylene gas-adsorbent (see, for example, JP-A-2000-37142).

CITATION LIST

Patent Literature

[Patent document 1] JP-A-2002-345340
[Patent document 2] JP-A-2000-37142

SUMMARY OF INVENTION

Technical Problem

However, the fruit sugar content-increasing solution disclosed in JP-A-2002-345340 and the fruit bag disclosed in JP-A-2000-37142 have a problem that they are used before harvesting and are not for improving the sugar content of fruit after harvesting. Also, in the fruit bag disclosed in JP-A-2000-37142, although oxidative damage can be prevented by suppressing ethylene generation of fruit since ethylene gas is adsorbed, there is a problem that taste potentially deteriorates by excessively suppressing ethylene generation and thus suppressing the ripening of fruit.

The present invention focus on such problems, and thus the present invention has been made. An object thereof is to provide a sugar content-improving material which can prevent oxidative damage of fruits and vegetables after harvesting, and also can improve the sugar content, a method for improving the sugar content of fruits or vegetables, fruits or vegetables having an improved sugar content, a sugar component-adjusting material, a method for adjusting a sugar component of fruits and vegetables, fruits or vegetables having an adjusted sugar component, a taste-adjusting material, a method for adjusting the taste of fruits or vegetables, and fruits or vegetables having adjusted taste.

Solution to Problem

As shown in FIG. 14, ethylene released by vegetables and fruits is one essential plant hormone for the ripening of plants. Plants derive sugar and flavor in the ripening process. In such a process, ethylene is released from methionine, which is one type of amino acid. However, when ethylene is excessively generated in plants, the plants become oxidatively damaged. Therefore, the controlling of ethylene in plants is one important function for plants.

It is said that ethylene released in plants is degraded by ethylene oxidase and thus the concentration thereof in plants is controlled. However, adjustment is not possible when the supply of nutritional components such as water and oxygen stops in the harvesting process, and ethylene is excessive generated and released outside of the plants. Ethylene released to the outside is oxidatively degraded by the natural environment (sun and heat), and plant functions degrade by the exsogenous progression of plant oxidization. Since this phenomenon is observed after fruit picking, ethylene control is essential to the maturation and storage of plants.

Since oxidative damage by ethylene originates from ethylene oxide, which is a reaction product of ethylene gas and oxygen gas, this secondary oxidation can be prevented if a material having an anti-oxidation function is used. The present inventors have found that a method for controlling ethylene by performing adsorption of ethylene released from plants with a glucide and suppressing the oxidative action from excessively generated ethylene oxide with a polyphenol, thus completing the present invention.

That is, the sugar content-improving material, the sugar component-adjusting material, and the taste-adjusting material of the present invention include a breathable sheet containing proanthocyanidin and trehalose, wherein the proanthocyanidin is contained in the sheet in a proportion of 250 to 300 mg/m$^2$ and the trehalose is contained in the sheet in a proportion of 5 g/m$^2$.

The trehalose in the sugar content-improving material, the sugar component-adjusting material, and the taste-adjusting material of the present invention adsorbs ethylene released from plants. The trehalose may be any of the three isomers, an α,α isomer, an α,β isomer and a β,β isomer.

The sheet in the sugar content-improving material, the sugar component-adjusting material, and the taste-adjusting material of the present invention may be bag-like, box-like, a folded back shape, roll-like, or any other shape. Also, the sugar content-improving material, the sugar component-adjusting material, and the taste-adjusting material of the present invention preferably have permeability. There are no particular restrictions on the material of the sheet, and may be a tissue paper, a cardboard paper, the other paper, a nonwoven fabric, a fiber product, a food fiber, and the like, and such may be natural materials or artificial materials. The sheet preferably has flexibility so as to easily wrap objects.

In the present invention, the proanthocyanidin and the trehalose can be contained in the sheet by a method of immersing the sheet in an aqueous solution thereof, a method of spraying a solution thereof onto the sheet, or the like.

In addition to proanthocyanidin and trehalose, the sugar content-improving material, the sugar component-adjusting material, and the taste-adjusting material of the present invention may contain additives such as salt and other minerals, antibacterial agents, fungicides and deodorants.

The sugar content-improving material, the sugar component-adjusting material, and the taste-adjusting material of the present invention are mainly used by wrapping fruits or vegetables after harvesting therein. Since the glucide adsorbs ethylene released from the plant and polyphenol suppresses the oxidative action by excessively generated ethylene oxide, it is possible to prevent oxidative damage of fruits and vegetables after harvesting as well as improve the sugar content. Also, it is possible to adjust a sugar component and adjust the taste thereby.

Examples of fruits suitable for improving the sugar content, adjusting a sugar component, and adjusting the taste by application of the present invention include apples, pears, peaches, bananas, tomatoes, watermelons, strawberries, persimmons, melons and cherries. Examples of vegetables include root vegetables such as carrots, Chinese yams, Japanese radishes, turnips, potatoes and sweet potatoes; leaf vegetables such as spinach, Chinese cabbage, cabbage, broccoli, cauliflower and komatsuna; and fruit vegetables such as cucumbers, tomatoes, eggplants, okra, beans and sweet pepper.

Since the self-protection function of fruits and vegetables deteriorates by picking, fruits and vegetables by themselves after harvesting cannot prevent the proliferation of putrefactive bacteria and the like. However, since proanthocyanidin has a high antibacterial action, it is possible to suppress the proliferation of putrefactive bacteria and the like for fruits and vegetables after harvesting and possible to prevent the generation of fungal bacteria and the like by the sugar content-improving material, the sugar component-adjusting material, and the taste-adjusting material of the present invention. It is thus possible to compensate the self-protection function of fruits and vegetables by the antibacterial action of proanthocyanidin. Also, it is possible to suppress the impact on humans by proanthocyanidin. The raw material of proanthocyanidin is preferably grape seeds, black soybeans, and the like, and although the raw material is irrelevant, proanthocyanidin derived from grape seeds is particularly preferable.

The sugar content-improving material, the sugar component-adjusting material, and the taste-adjusting material of the present invention have a sugar content-improving effect, a sugar component-adjusting action, a taste-adjusting action, and antibacterial action, an ethylene-adsorbing effect, and the like.

The sugar component-adjusting material of the present invention has the effect of promoting or suppressing the increase/decrease over time of a sugar component of wrapped fruit depending of the type of sugar. Specifically, the sugar component-adjusting material has the effect of promoting decrease in fructose concentration, promoting increase in glucose concentration, and suppressing decrease in sucrose concentration. This effect is particularly remarkable when apples are wrapped. Also, there is the effect of promoting increase in glucose concentration when peaches are wrapped.

The taste-adjusting material of the present invention can improve the balance of sweetness, sourness and flavor, and can thus increase taste quality when fruits, particularly apples, are wrapped.

The method for improving the sugar content of fruits or vegetables of the present invention is characterized by wrapping the fruits or vegetables in the sugar content-improving material of the present invention. Also, fruits or vegetables having an improved sugar content of the present invention are characterized by being wrapped in the sugar content-improving material of the present invention. In accordance with the method for improving the sugar content of fruits or vegetables of the present invention, fruits or vegetables having an improved sugar content of the present invention can be easily produced.

The method for improving sugar components of fruits or vegetables of the present invention is characterized by wrapping the fruits or vegetables in the sugar component-adjusting material of the present invention. Also, fruits or vegetables having adjusted sugar components of the present invention are characterized by being wrapped in the sugar component-adjusting material of the present invention. In accordance with the method for adjusting sugar components of fruits or vegetables of the present invention, fruits or vegetables having adjusted sugar components of the present invention can be easily produced.

The method for adjusting the taste of fruits or vegetables of the present invention is characterized by wrapping the fruits or vegetables in the taste-adjusting material of the present invention. Also, fruits or vegetables having an adjusted taste of the present invention are characterized by being wrapped in the taste-adjusting material of the present invention. In accordance with the method for adjusting the taste of fruits or vegetables of the present invention, fruits or vegetables having an adjusted taste of the present invention can be easily produced.

In accordance with the present invention, it is possible to provide a sugar content-improving material that can prevent oxidative damage of fruits and vegetables after harvesting, and also can improve the sugar content, a method for improving the sugar content of fruits or vegetables, fruits or vegetables having an improved sugar content, a sugar component-adjusting material, a method for adjusting the sugar content of fruits and vegetables, fruits and vegetables having an adjusted sugar content, a taste-adjusting material, a method for adjusting the taste of fruits or vegetables, and fruits or vegetables having an adjusted taste.

DESCRIPTION OF EMBODIMENTS

Example 1

Figure 1:
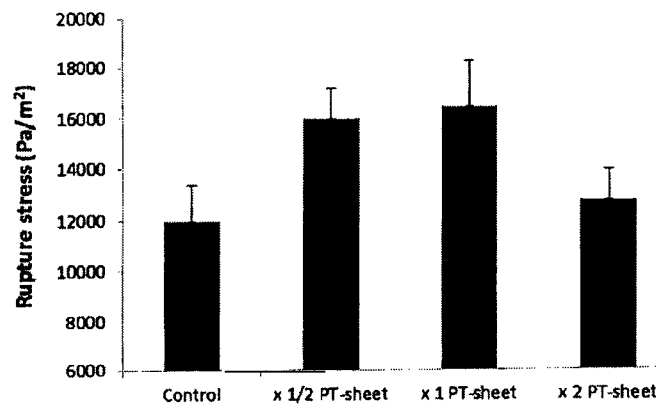
FIG. 1 is a graph showing the results of the first sugar content improvement test for apples with a sugar content-improving material of Example of the present invention.

The sugar content-improving material, the method for improving the sugar content of fruits or vegetables, fruits or vegetables having an improved sugar content, the sugar component-adjusting material, the method for adjusting the sugar content of fruits and vegetables, fruits and vegetables having an adjusted sugar content, the taste-adjusting material, the method for adjusting the taste of fruits or vegetables, and fruits or vegetables having adjusted taste of Examples of the present invention are explained below.

The sugar content-improving material of Example of the present invention includes a sheet-like substrate having breathability, permeability, and flexibility containing a polyphenol and a glucide.

[First Sugar Content Improvement Test in Case of Apples]

A test using apples was performed in order to confirm the effect of improving the sugar content by the sugar content-improving material of Example of the present invention. As test samples, an apple wrapped in the sugar content-improving material of Example of the present invention (hereinafter, referred to as a "test area 1") and an apple just as it is (hereinafter, referred to as a "test area 2") were prepared.

The sugar content-improving material of Example was prepared by the following method.

An aqueous solution was prepared by dissolving 3 g of a plant-derived aqueous polyphenol extract (derived from grape seeds, amount of proanthocyanidin: 95% by weight, product name: "Leucoseiect", manufactured by Indena) and 5 g of trehalose in 1,000 ml of distilled water. After a mesh-like nonwoven fabric (basis weight: 50 g/m$^2$) was immersed in such aqueous solution so that the amount of proanthocyanidin in the nonwoven fabric became 300 mg/m$^2$ and trehalose became 5 g/m$^2$, such was dried in a hot air dryer at 120° C. for two hours to prepare the sugar content improving material. Unless otherwise indicated below, that prepared by this method was used as the sugar content-improving material.

Each test sample was stored in a refrigerator and the sugar content was measured after the elapsing of given periods with a sugar content-measuring instrument (product name of "Portable Sugar Content Meter RA-250 Series" manufactured by Kyoto Electronics Manufacturing Co., Ltd.). The test results are shown in Table 1 and FIG. 1.

TABLE 1

| Elapsed time | Sugar content (%) | |
|---|---|---|
| (days) | Test area 1 | Test area 2 |
| 0 | 15.3 | 15.3 |
| 6 | 17.4 | 16.2 |
| 13 | 17.7 | 15.9 |
| 21 | 16.9 | 15.9 |
| 28 | 17.7 | 15.8 |
| 38 | 17.8 | 17.5 |
| 47 | 16.5 | 15.5 |
| 60 | 16.8 | Decay |
| 68 | 16 | — |
| 77 | 17.3 | — |
| 87 | 17.1 | — |
| 98 | 17.1 | — |
| 108 | 17.8 | — |
| 118 | 17.8 | — |
| 130 | 17.8 | — |
| 138 | 16.8 | — |
| 147 | 16.4 | — |

As shown in Table 1 and FIG. 1, it was confirmed that the sugar content of the apple of test area 1 was higher compared to the apple of test area 2 over the entire storage period. In particular, whereas the apple of test area 2 decayed on day 60 and thus the odor from decay increased, the apple of test area 1 did not decay and was in a sufficiently edible state. The sugar content-improving material of Example of the present invention can thus prevent oxidative damage of fruit after harvesting, and also improve the sugar content. Also, the progression of decay can be delayed.

[Second Sugar Content Improvement Test in Case of Apples]

The same test was performed using apples in order to confirm the effect of improving the sugar content by the sugar content-improving material of Example of the present invention. As test samples, apples wrapped in the sugar content-improving material of Example of the present invention (hereinafter referred to as a "test area 1"), apples wrapped in the sugar content-improving material of Example of the present invention that has been covered with a polyethylene film in order to decrease oxygen permeability (hereinafter referred to as a "test area 2"), and apples just as they are (hereinafter referred to as a "test area 3") were prepared. Each test sample was stored in a refrigerator and the sugar content was measured after the elapsing of given periods with a sugar content-measuring instrument (product name: "Portable Sugar Content Meter IRA-250 Series" manufactured by Kyoto Electronics Manufacturing Co., Ltd.). Five apples for each state were prepared and the measurement values were determined by calculating the average sugar content for each. The test results are shown in Table 2 and FIG. 2.

TABLE 2

| Elapsed time | Sugar content (%) | | |
|---|---|---|---|
| (days) | Test area 1 | Test area 2 | Test area 3 |
| 0 | 15.92 | 15.92 | 15.92 |
| 10 | 16.47 | 16.04 | 16.08 |

TABLE 2-continued

| Elapsed time | Sugar content (%) | | |
|---|---|---|---|
| (days) | Test area 1 | Test area 2 | Test area 3 |
| 19 | 16.29 | 15.77 | 15.60 |
| 32 | 16.06 | 16.05 | 15.75 |
| 40 | 15.93 | 15.74 | 15.63 |
| 49 | 15.97 | 15.75 | 15.63 |
| 59 | 16.38 | 15.88 | 14.48 |
| 70 | 16.20 | 16.20 | — |

Figure 2:
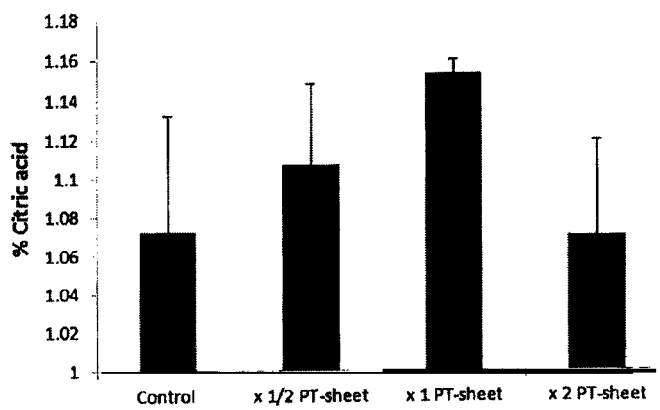
FIG. 2 is a graph showing the results of the second sugar content improvement test for apples with a sugar content-improving material of Example of the present invention.

As shown in Table 2 and FIG. 2, it was confirmed that the sugar content of the apples of test area 1 was higher compared to the apples of test area 2 and the apples of test area 3 over the entire storage period. In particular, it was confirmed that whereas decay of the apples of test area 3 started from day 49 and the decay of the apples of test area 2 started from day 59, the decay of the apples of test area 1 started on day 70. The sugar content-improving material of Example of the present invention can thus prevent oxidative damage of fruit after harvesting, and also improve the sugar content. Also, the progression of decay can be delayed.

[Third Sugar Content Improvement Test in Case of Bananas]

A test was performed using bananas in order to confirm the effect of improving the sugar content by the sugar content-improving material of Example of the present invention. As test samples, a green banana from the Philippines wrapped in the sugar content-improving material of Example of the present invention (hereinafter referred to as a "test area 1"), a banana inserted just as it is into a cardboard box (hereinafter referred to as a "test area 2"), and a banana inserted into a plastic bag and sealed (hereinafter referred to as a "test area 3") were prepared. The sugar content was measured for each test sample after the elapsing of given periods with a sugar content-measuring instrument (product name: "Portable Sugar Content Meter RA-250 Series" manufactured by Kyoto Electronics Manufacturing Co., Ltd.). The test results are shown in Table 3 and FIG. 3.

TABLE 3

| Elapsed time | Sugar content (%) | | |
|---|---|---|---|
| (days) | Test area 1 | Test area 2 | Test area 3 |
| 0 | 4.75 | 4.75 | 4.75 |
| 5 | 10.40 | 7.45 | 7.00 |
| 7 | 10.40 | 9.75 | 7.10 |
| 9 | 11.95 | 11.20 | 6.70 |
| 13 | 26.65 | 12.50 | 12.15 |
| 15 | 26.35 | 13.35 | 12.25 |
| 17 | 21.70 | 12.45 | 11.45 |

Figure 3:
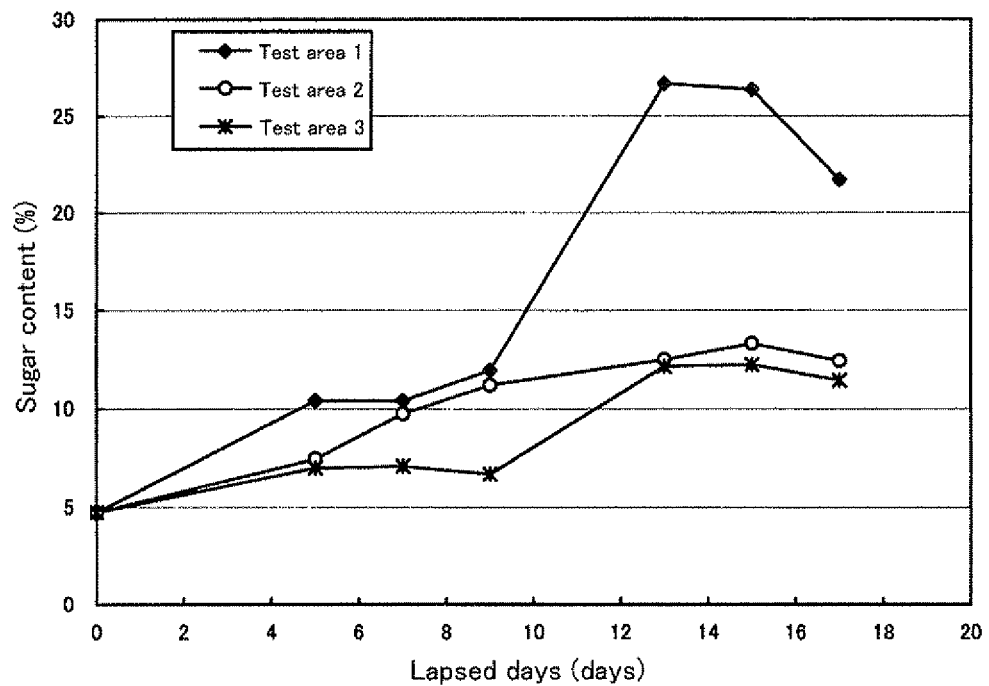
FIG. 3 is a graph showing the results of the first sugar content improvement test for bananas with a sugar content-improving material of Example of the present invention.

As shown in Table 3 and FIG. 3, it was confirmed that the sugar content of the banana of test area 1 was higher compared to the banana of test area 2 and the banana of test area 3 over the entire storage period. In particular, it was confirmed that whereas decay of the banana of test area 2 started on day 9 and the banana of test area 3 started on day 7, the decay of the banana of test area 1 started on day 17. The sugar content-improving material of Example of the present invention can thus prevent oxidative damage of fruit after harvesting as well as improve the sugar content. Also, the progression of decay can be delayed.

[Fourth Sugar Content Improvement Test in Case of Bananas]

A test using bananas was performed in order to confirm the effect of improving the sugar content by the sugar content-improving material of Example of the present invention. As test samples, a banana from the Philippines wrapped in the sugar content-improving material of Example of the present invention (hereinafter, referred to as "test area 1"), and a banana wrapped in a mesh-like nonwoven fabric not including a polyphenol and a glucide (hereinafter, referred to as "test area 2") were prepared. The mesh-like nonwoven fabric of test area 2 was prepared by, after immersing a mesh-like nonwoven fabric (basis weight: 50 g/m$^2$) in distilled water, drying in a hot air dryer at 120° C. for two hours. Hereinafter, the mesh-like nonwoven fabric prepared by this method is referred to as "non-containing nonwoven fabric". The sugar content was measured for each test sample after the elapsing of given periods with a sugar content-measuring instrument (product name: "Portable Sugar Content Meter RA-250 Series" manufactured by Kyoto Electronics Manufacturing Co., Ltd.). The test results are shown in FIG. 4.

Figure 4:
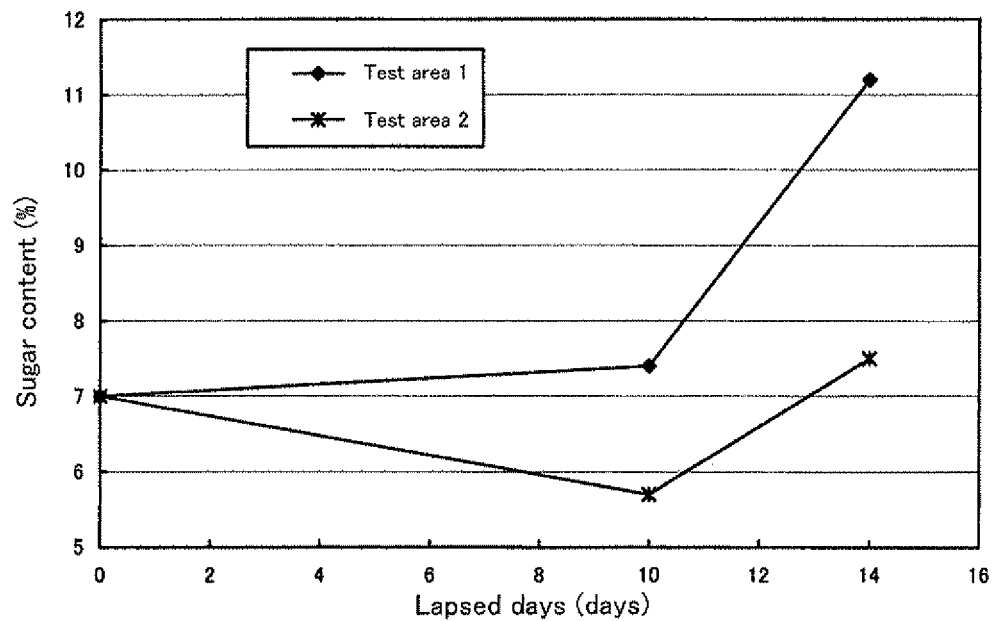
FIG. 4 is a graph showing the results of the second sugar content improvement test for bananas with a sugar content-improving material of Example of the present invention.

As shown in FIG. 4, it was confirmed that the sugar content of the banana of test area 1 was higher compared to the banana of test area 2 over the entire storage period. The sugar content-improving material of Example of the present invention can thus prevent oxidative damage of fruit after harvesting as well as improve the sugar content.

[Fifth Sugar Content Improvement Test in Case of Bananas]

A test using bananas was performed in order to confirm the effect of improving the sugar content by the sugar content-improving material of Example of the present invention. As test samples, a banana wrapped in a mesh-like nonwoven fabric (basis weight: 50 g/m$^2$) that contains an aqueous solution with trehalose in a proportion of 5 g/m$^2$ and proanthocyanidin in a proportion of 0.25 g/m$^2$ and that has been dried (hereinafter, referred to as "test area 1"), a banana wrapped in the non-containing nonwoven fabric (hereinafter referred to as a "test area 2"), and a banana wrapped in newspaper (hereinafter, referred to as a "test area 3") were prepared. The sugar content (Bx) was measured for each test sample on the day measurement started and after the elapsing of 14 days with a sugar content-measuring instrument (product name: "Portable Sugar Content Meter RA-250 Series" manufactured by Kyoto Electronics Manufacturing Co., Ltd.). The test results are shown in Table 4.

TABLE 4

| | Sugar content (Bx) | |
|---|---|---|
| | The day measurement started | On day 14 |
| Test area 1 | 6 | 18 |
| Test area 2 | 6 | 8 |
| Test area 3 | 6 | 8 |

As shown in Table 4, it was confirmed that the sugar content (Bx) of the banana of test area 1 was higher compared to the other bananas. The sugar content-improving material of Example of the present invention can thus prevent oxidative damage of fruit after harvesting, and also improve the sugar content.

[Sixth Sugar Content Improvement Test in Case of Bananas]

A test using bananas was performed in order to confirm the effect of improving the sugar content by the sugar content-improving material of Example of the present invention. As test samples, a banana wrapped in the sugar content-improving material of Example of the present invention (hereinafter referred to as "test area 1") and a banana wrapped in the non-containing nonwoven fabric (hereinafter referred to as a "test area 2") were prepared. The sugar content (Brix) was measured for each test sample after the elapsing of given periods with a sugar content-measuring instrument (product name: "Portable Sugar Content Meter RA-250 Series" manufactured by Kyoto Electronics Manufacturing Co., Ltd.). The test results are shown in FIG. 5.

Figure 5:
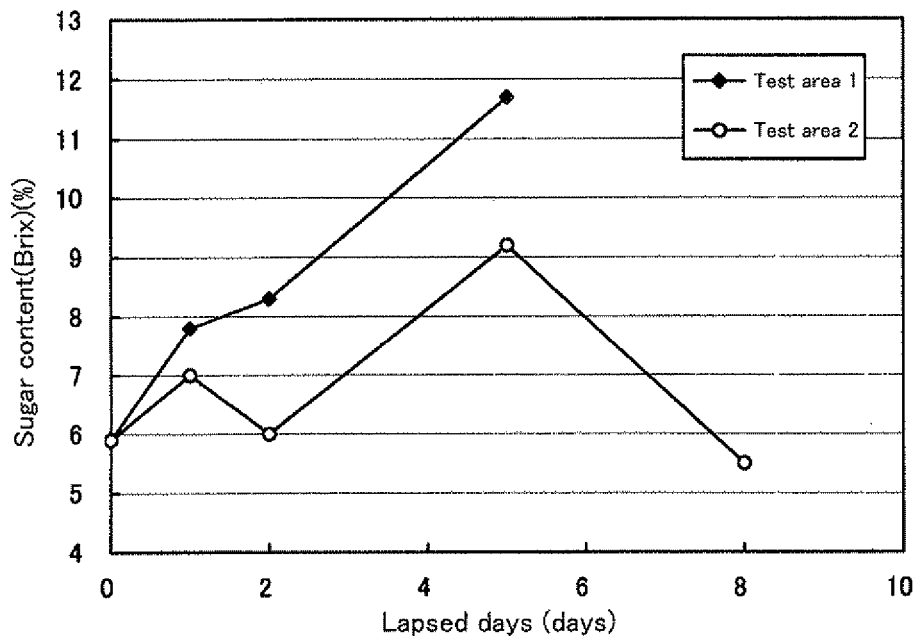
FIG. 5 is a graph showing the results of the third sugar content improvement test for bananas with a sugar content-improving material of Example of the present invention.

As shown in FIG. 5, it was confirmed that the sugar content of the banana of test area 1 was higher compared to the banana of test area 2 over the entire storage period. The sugar content-improving material of Example of the present invention can thus prevent oxidative damage of fruit after harvesting, and also improve the sugar content.

[Seventh Sugar Content Improvement Test in Case of Vegetables]

Tests using vegetables were performed in order to confirm the effect of improving the sugar content by the sugar content-improving material of Example of the present invention. Spinach and carrots were used as the vegetables. As the test samples, vegetables wrapped in a mesh-like nonwoven fabric (basis weight: 50 g/m$^2$) that contains an aqueous solution with trehalose in a proportion of 5 g/m$^2$ and proanthocyanidin in a proportion of 300 mg/m$^2$ and that has been dried (hereinafter referred to as a "test area 1"), and vegetables wrapped in the non-containing nonwoven fabric (hereinafter referred to as a "test area 2") were prepared. The sugar content (Brix) was measured for each test sample after the elapsing of given periods with a sugar content-measuring instrument (product name: "Portable Sugar Content Meter RA-250 Series" manufactured by Kyoto Electronics Manufacturing Co., Ltd.). The test results for spinach are shown in FIG. 6 and the test results for carrots are shown in FIG. 7.

Figure 6:
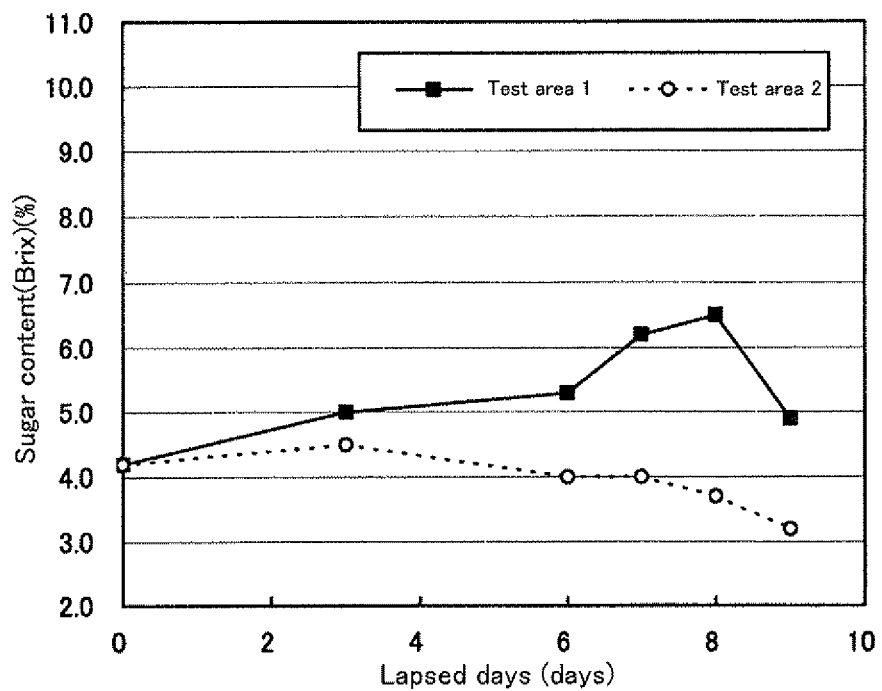
FIG. 6 is a graph showing the results of a sugar content improvement test for spinach with a sugar content-improving material of Example of the present invention.
Figure 7:
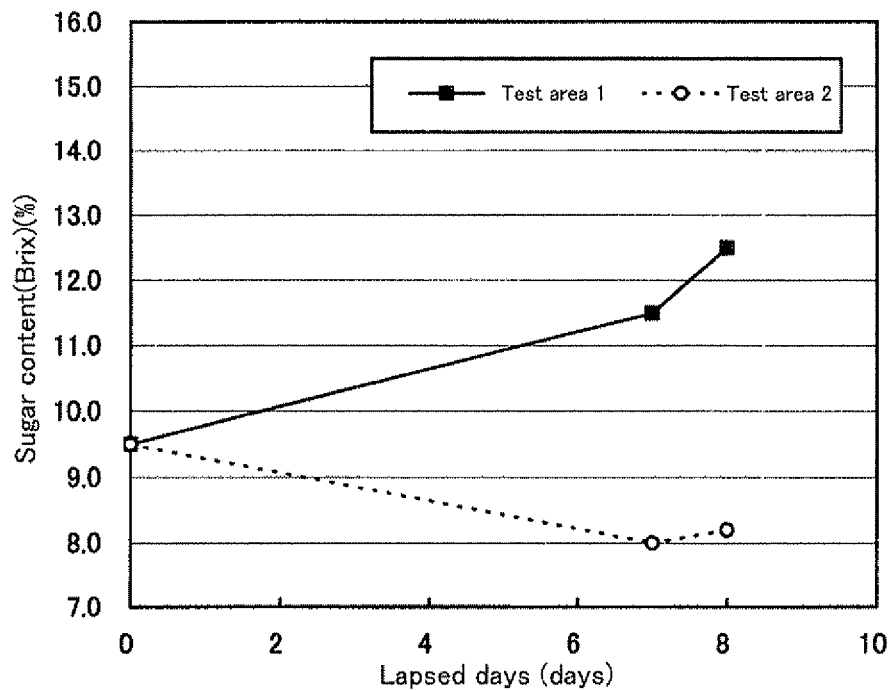
FIG. 7 is a graph showing the results of the content improvement test for carrots with a sugar content-improving material of Example of the present invention.

As shown in FIGS. 6 and 7, it was confirmed that the sugar contents of the vegetables of test area 1 were higher compared to the vegetables of test area 2 over the entire storage period. It can be said from such that the sugar content-improving material of Example of the present invention thus can prevent oxidative damage of vegetables after harvesting, and also improve the sugar content.

Next, the sugar component-adjusting material, the method for adjusting a sugar component of fruits and vegetables, and fruits and vegetables having adjusted sugar components of Example of the present invention are explained.

The sugar component-adjusting material includes a sheet-like substrate having breathability, permeability, and flexibility containing a polyphenol and a glucide.

Example 2

First Sugar Component Adjustment Test in Case of Apples

A test using apples was performed in order to confirm the effect of adjusting each sugar component by the sugar component-adjusting material of Example of the present invention. As test samples, an apple wrapped in a sugar component-adjusting material that is a sheet having a basis weight of 50 g/m$^2$ (hereinafter referred to as a "test area 1") among the sugar component-adjusting materials of Example of the present invention and an apple wrapped in the non-containing nonwoven fabric (hereinafter referred to as a "test area 2") were prepared.

The sugar component-adjusting material of Example was prepared by the following method.

An aqueous solution was prepared by dissolving 3 g of a plant-derived aqueous polyphenol extract (derived from grape seeds, amount of proanthocyanidin: 95% by weight, product name: "Leucoselect", manufactured by Indena.) and 5 g of trehalose in 1,000 ml of distilled water. After a mesh-like nonwoven fabric was immersed in such aqueous solution so that the amount of proanthocyanidin in the nonwoven fabric became 300 mg/m$^2$ and trehalose became 5 g/m$^2$, such was dried in a hot air dryer at 120° C. for two hours to prepare the sugar component-adjusting material. Unless otherwise indicated below, that prepared by this method was used as the sugar component-adjusting material.

The concentration of each sugar component was measured for each test sample on the starting day of measurement and after 10 days had elapsed by high-performance liquid chromatography (HPLC; manufactured by Shiseido Co., Ltd, product name: "High-Performance Liquid Chromatograph NANOSPACE SI-2"). The measured sugar components were fructose, glucose, and sucrose. The test results are shown in FIG. 8.

Figure 8:
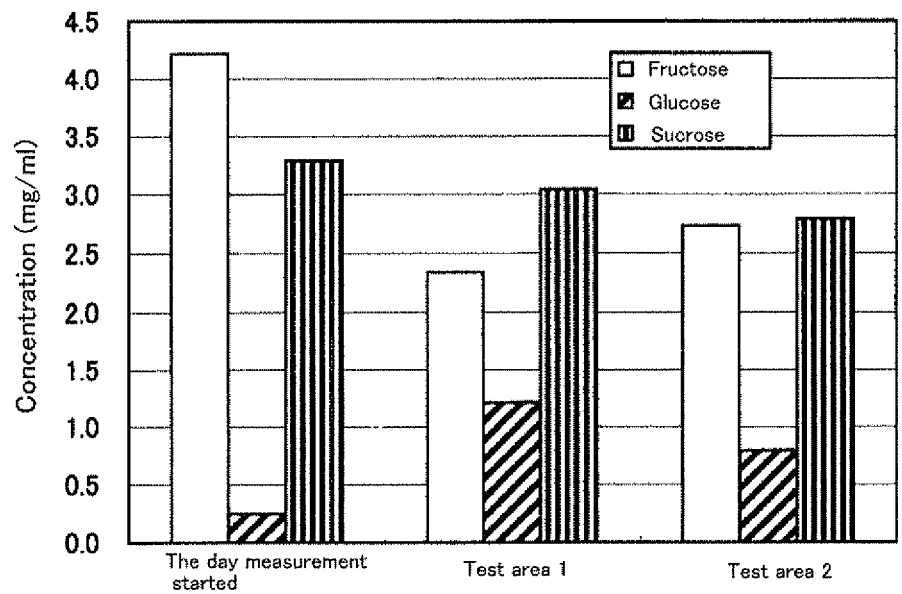
FIG. 8 is a graph showing the results of a sugar component adjustment test for apples with a sugar component-adjusting material of Example of the present invention.

As shown in FIG. 8, it was confirmed that the concentration of fructose became slightly lower in the apple of test area 1 compared to the apple of test area 2. Also, it was confirmed that the concentration of glucose increased for the apple of test area 1. It was confirmed that roughly the same concentration of sucrose was maintained for 10 days. The sugar component-adjusting material of Example of the present invention can thus adjust each sugar component.

[Second Sugar Component Adjustment Test in Case of Peaches]

A test using peaches was performed in order to confirm the effect of adjusting each sugar component by the sugar component-adjusting material of Example of the present invention. As test samples, a peach wrapped in a sugar component-adjusting material (basis weight: 50 g/m$^2$) of the present invention (hereinafter referred to as a "test area 1") and a peach wrapped in the non-containing nonwoven fabric (hereinafter referred to as a "test area 2") were prepared. The concentration of each sugar component was measured for each test sample after the elapsing of given periods by high-performance liquid chromatography (HPLC; manufactured by Shiseido Co., Ltd, product name: "High-Performance Liquid Chromatograph NANOSPACE SI-2"). The measured sugar component was glucose. The test results are shown in FIG. 9.

Figure 9:
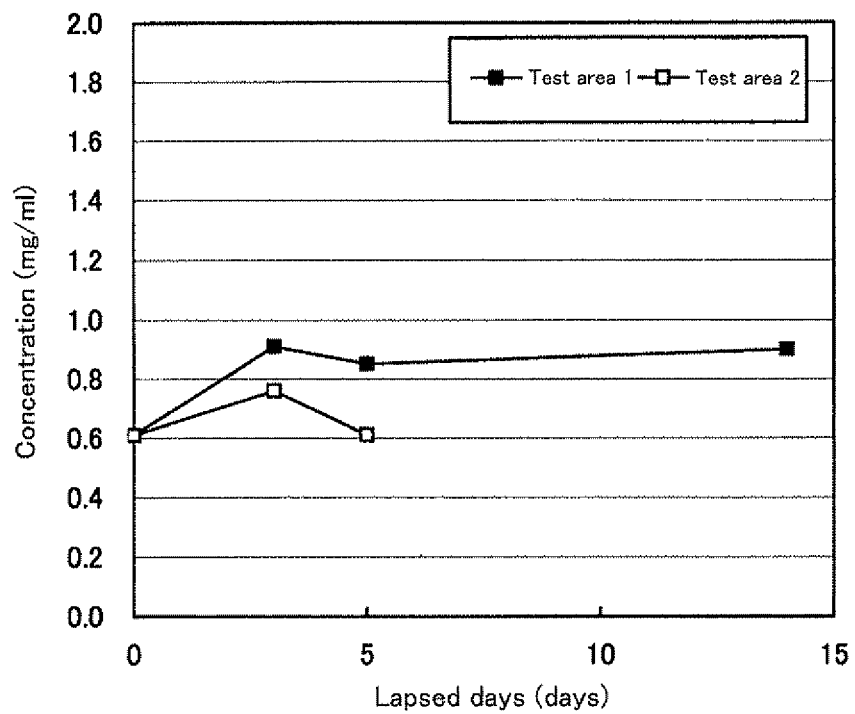
FIG. 9 is a graph showing the results of a sugar component adjustment test for peaches with a sugar component-adjusting material of Example of the present invention.

As shown in FIG. 9, it was confirmed that the concentration of glucose increased in the peach of test area 1 compared to the peach of test area 2. The peach of test area 2 decayed after 5 days. The sugar component-adjusting material of Example of the present invention can thus adjust each sugar component.

Next, the taste-adjusting material, the method for adjusting the taste of fruits and vegetables, and fruits or vegetables having adjusted taste of Example of the present invention are explained.

The taste-adjusting material includes a sheet-like substrate having breathability, permeability, and flexibility containing a polyphenol and a glucide.

Example 3

Taste Adjustment Test in Case of Apples

A test using apples was performed in order to confirm the effect of adjusting taste by the taste-adjusting material of Example of the present invention. As test samples, an apple wrapped in a taste-adjusting material of Example of the present invention (hereinafter referred to as a "test area 1") and an apple wrapped in the non-containing nonwoven fabric (hereinafter referred to as a "test area 2") were prepared.

The taste-adjusting material of xample was prepared by the following method.

An aqueous solution was prepared by dissolving 3 g of a plant-derived aqueous polyphenol extract (derived from grape seeds, amount of proanthocyanidin: 95% by weight, product name: "Leucoselect", manufactured by Indena) and 5 g of trehalose in 1,000 ml of distilled water. After a mesh-like nonwoven fabric (basis weight: 50 g/m$^2$) was immersed in such aqueous solution so that the amount of proanthocyanidin in the nonwoven fabric became 300 mg/m$^2$ and trehalose became 5 g/m$^2$, such was dried in a hot air dryer at 120° C. for two hours to prepare the taste-adjusting material.

A taste sensory test was performed by 30 men and women (average age: 37 years old) on the test samples after the elapsing of given periods (2 days to 8 weeks). For each test sample, scores were given for sweetness, flavor, sourness, and overall evaluation, and the average value thereof was calculated. Also, hardness (IBS) was measured by a hardness meter. The correlation between the sweetness, flavor, sourness, overall evaluation, and hardness for apples harvested from a tree A before the proper time of harvesting to after the proper time of harvesting, apples harvested from the tree A after the proper time of harvesting, apples harvested from a tree B (tree different to A) before the proper time of harvesting to after the proper time of harvesting, and apples harvested from the tree B after the proper time of harvesting was examined, and the results thereof are shown in FIGS. 10 to 13.

Figure 10:
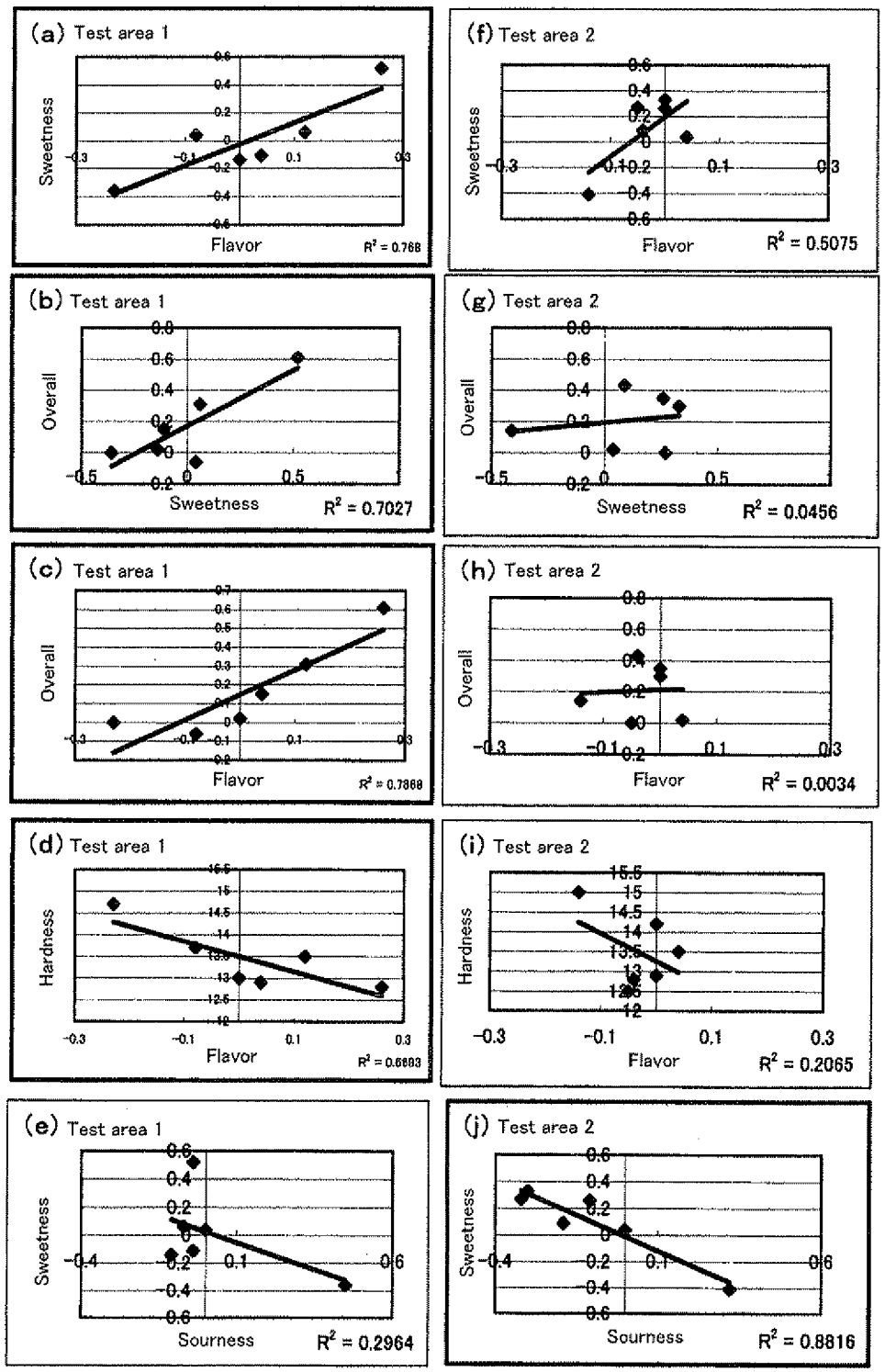
FIG. 10 is graphs showing a correlation between the (a) flavor and sweetness of the test area 1, (b) sweetness and overall, (c) flavor and overall, (d) flavor and hardness, (e) sourness and sweetness, (f) flavor and sweetness of the test area 2, (g) sweetness and overall, (h) flavor and overall, (i) flavor and hardness, and (j) sourness and sweetness as results of the taste adjustment test for apples harvested from a tree A before the proper time of harvesting to after the proper time of harvesting with a taste-adjusting material of Example of the present invention.

As shown in FIG. 10, although apples harvested from the tree A before the proper time of harvesting to after the proper time of harvesting had a correlation between the sweetness, flavor, and overall evaluation for test area 1, there was no correlation for test area 2. It can be said from such that apples picked early and apples harvested at the proper time can be apples having a high overall evaluation with sweet flavor by wrapping in the taste-adjusting material of Example of the present invention. Also, test area 1 had a correlation between the hardness and flavor. This shows that the flesh of fruit becomes softer with improvement in flavor. Furthermore, although test area 1 did not have a correlation between the sweetness and sourness, test area 2 had correlation. However, since this was a negative correlation, although sweetness of the apples is felt since sourness decreases when sweetness increases, this shows that the taste is becoming bland.

Figure 11:
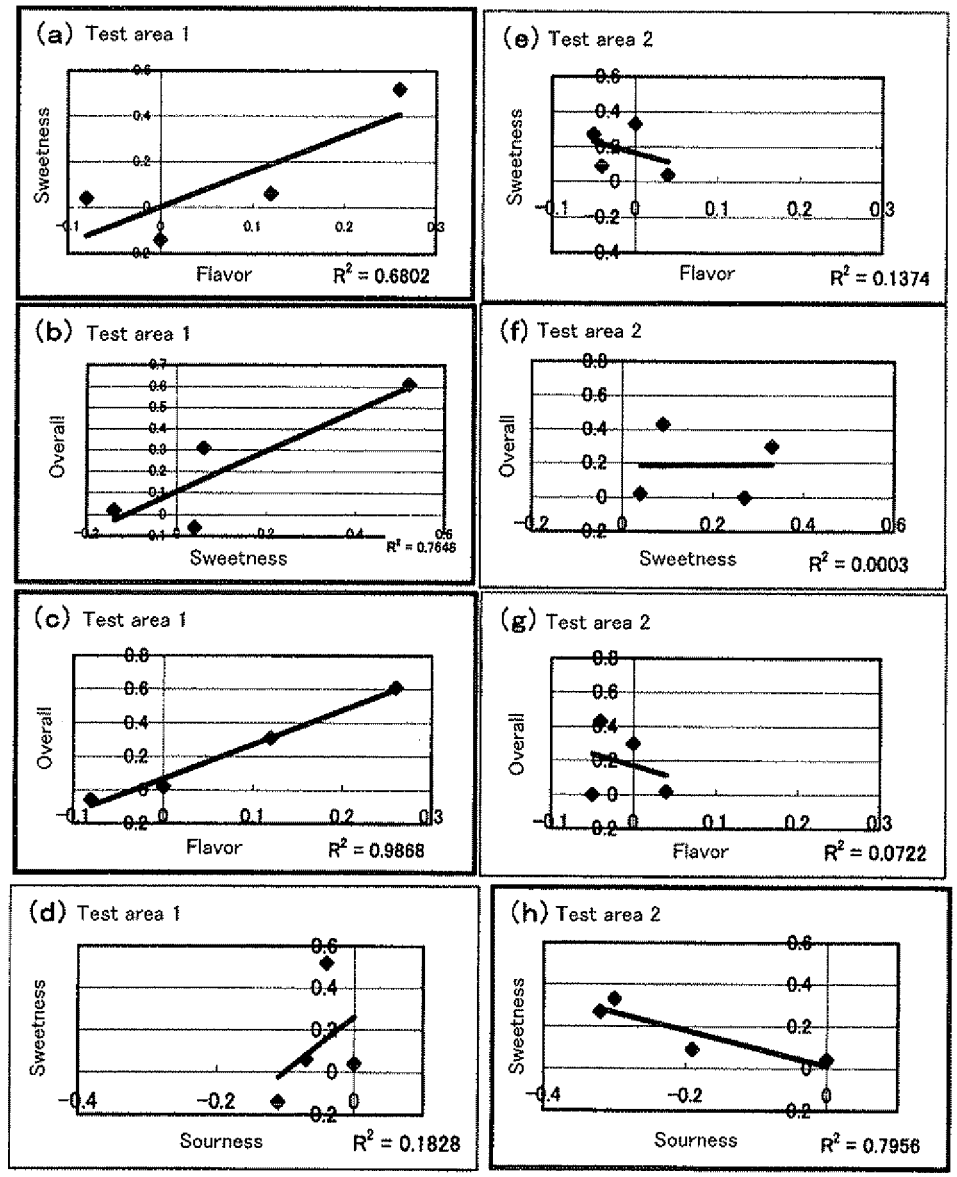
FIG. 11 is graphs showing a correlation between the (a) flavor and sweetness of the test area 1, (b) sweetness and overall, (c) flavor and overall, (d) sourness and sweetness, (e) flavor and sweetness of the test area 2, (f) sweetness and overall, (g) flavor and overall, (h) sourness and sweetness as results of the taste adjustment test for apples harvested from the tree A after the proper time of harvesting with a taste-adjusting material of Example of the present invention.

As shown in FIG. 11, although apples harvested from the tree A after the proper time of harvesting had a correlation between the sweetness, overall evaluation, and flavor for test area 1, there was no correlation for test area 2. It can be said from such that apples harvested at the proper time can be apples having a higher overall evaluation with a sweet flavor by the taste-adjusting material of Example of the present invention. Also, although test area 1 did not have a correlation between the sweetness and sourness, test area 2 had correlation. However, since this was a negative correlation, although the sweetness of the apples is felt since when sweetness increases sourness decreases, this shows that the taste becomes bland.

Figure 12:
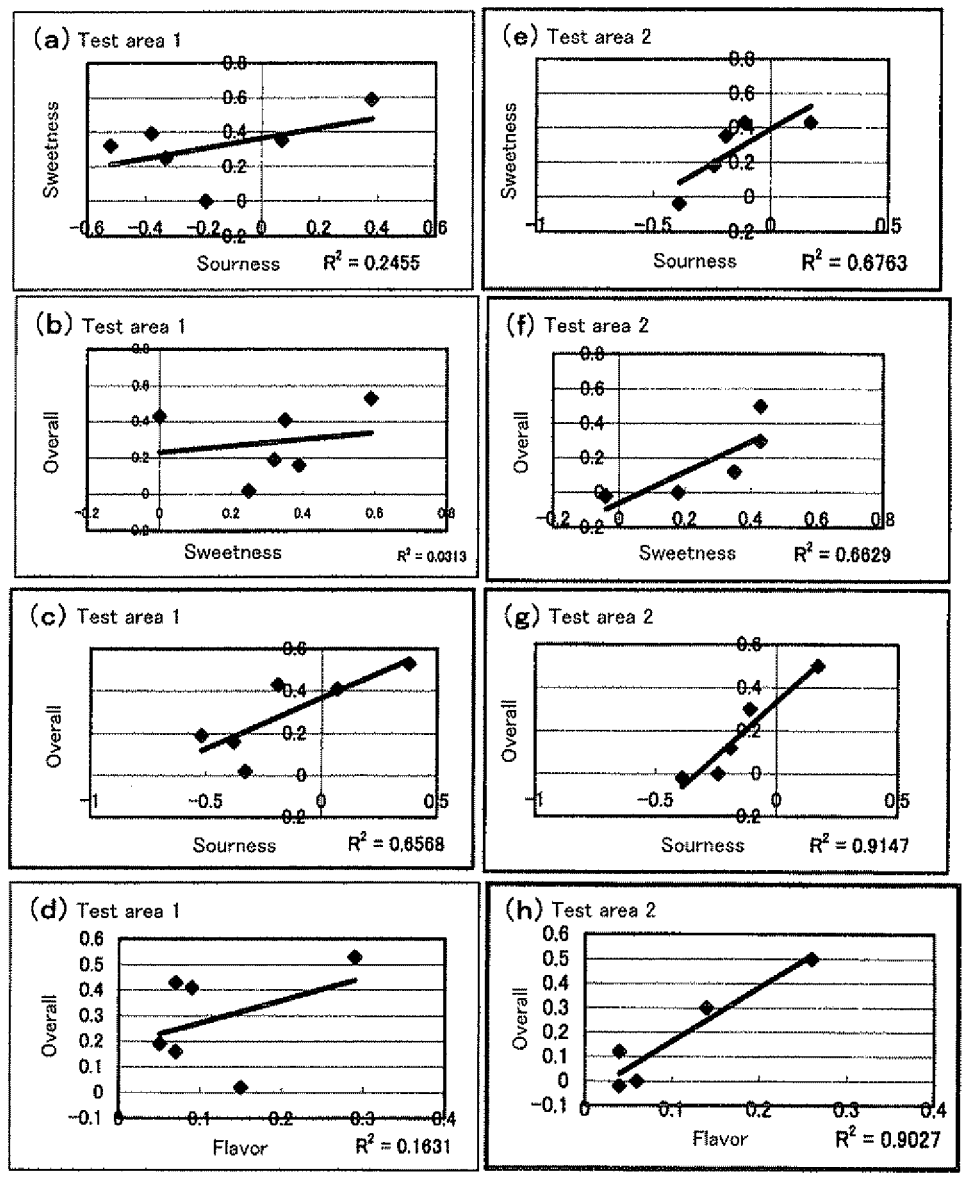
FIG. 12 is graphs showing a correlation between the (a) sourness and sweetness of the test area 1, (b) sweetness and overall, (c) sourness and overall, (d) flavor and overall, (e) sourness and sweetness of the test area 2, (f) sweetness and overall, (g) sourness and overall, (h) flavor and overall as results of the taste adjustment test for apples harvested from a tree B, being different to the tree A, before the proper time of harvesting to after the proper time of harvesting with a taste-adjusting material of Example of the present invention.

As shown in FIG. 12, apples harvested from the tree B, which is different to A, before the proper time of harvesting to after the proper time of harvesting had a correlation between the sweetness, sourness, and overall evaluation for test area 2 and had a correlation between the sourness and overall evaluation for test area 1. Also, although test area 1 did not have a correlation between the sweetness and overall evaluation, the scores for sweetness and overall evaluation were generally higher than test area 2. It can be said from such that the apples picked early and the apples harvested at the proper time can be apples more delicious than test area 2 by the taste-adjusting material of Example of the present invention.

Figure 13:
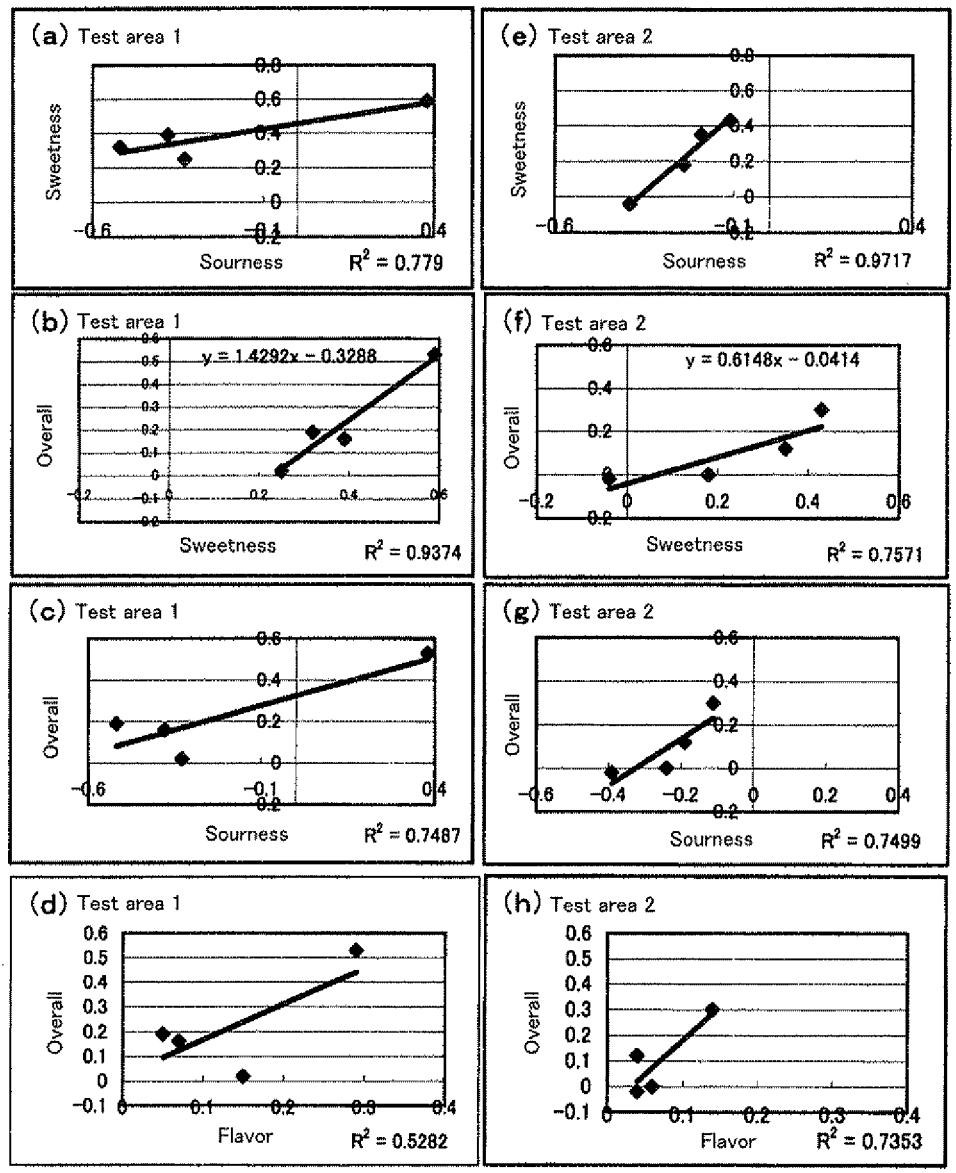
FIG. 13 is graphs showing a correlation between the (a) sourness and sweetness of the test area 1, (b) sweetness and overall, (c) sourness and overall, (d) flavor and overall, (e) sourness and sweetness of the test area 2, (f) sweetness and overall, (g) sourness and overall, (h) flavor and overall as results of the taste adjustment test for apples harvested from the tree B, being different to tree A, after the proper time of harvesting with a taste-adjusting material of Example of the present invention.
Figure 14:
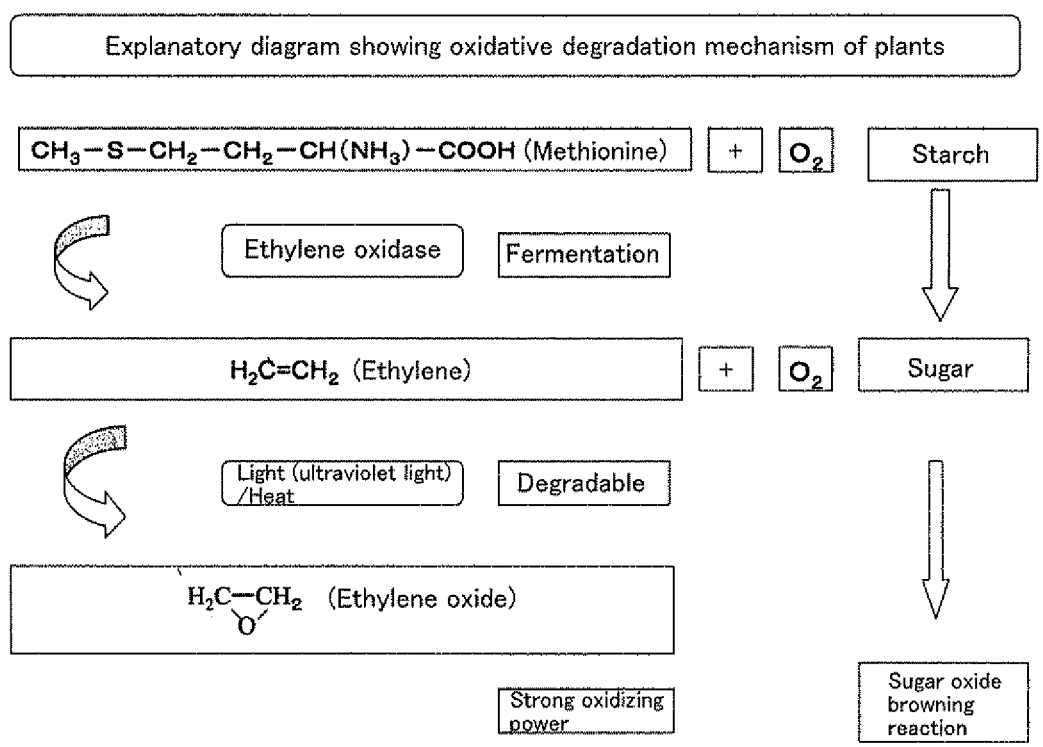
FIG. 14 is an explanatory diagram showing an oxidative degradation mechanism of plants.

As shown in FIG. 13, the apples harvested from the tree B after the proper time of harvesting had a correlation between the sweetness, sourness, and overall evaluation for both test area 1 and test area 2. Also, the scores for sweetness and overall evaluation were generally higher for test area 1 than test area 2. It can be said from such that by wrapping apples harvest at the proper time in the taste-adjusting material of Example of the present invention, apples more delicious than test area 2 are possible. Furthermore, since a correlation of apples harvested at the proper time was high for test area 1, it can be said that it is more effective for apples harvested at the proper time than apples picked early.

From the results of FIGS. 10 to 13, although there is a deviation between the trees, the balance between sweetness, sourness, and flavor becomes better, and overall evaluation increases with apples being wrapped in the taste-adjusting material of Example of the present invention. Also, apples having higher evaluations than past apples are possible by being wrapped in the taste-adjusting material of Example of the present invention.

The invention claimed is:

1. A method for improving a sugar content of a fruit or a vegetable, which comprises wrapping the fruit or the vegetable in a sugar content-improving material that comprises a breathable sheet containing proanthocyanidin and trehalose, wherein the proanthocyanidin is contained in the sheet in aproportion of 250 to 300 mg/m$^2$ and the trehalose is contained in the sheet in a proportion of 5 g/m$^2$.

2. The method according to claim 1, wherein the method achieves delay in a progression of decay of the fruit or vegetable wrapped in the sugar content-improving material.

3. A method for adjusting a sugar component of a fruit or a vegetable, which comprises wrapping the fruit or the vegetable in a sugar component-adjusting material that comprises a breathable sheet containing proanthocyanidin and trehalose, wherein the proanthocyanidin is contained in the sheet in a proportion of 250 to 300 mg/m$^2$ and the trehalose is contained in the sheet in a proportion of 5 g/m$^2$.

4. The method according to claim 3, wherein the method achieves delay in a progression of decay of the fruit or vegetable wrapped in the sugar component-adjusting material.

5. A fruit or a vegetable wrapped in a breathable sheet containing proanthocyanidin and trehalose, wherein the proanthocyanidin is contained in the sheet in a proportion of 250 to 300 mg/m$^2$ and the trehalose is contained in the sheet in a proportion of 5 g/m$^2$.

6. The wrapped fruit or vegetable according, to claim 5, wherein the fruit or vegetable exhibits an adjusted sugar component.

7. The wrapped fruit or vegetable according to claim 5, wherein the fruit or vegetable exhibits an adjusted taste.

8. The wrapped fruit or vegetable according to claim 5, wherein the fruit or vegetable exhibits an improved sugar component.

9. A method for adjusting the taste of a fruit or a vegetable, which comprises wrapping the fruit or the vegetable in a taste-adjusting material that comprises a breathable sheet containing proanthocyanidin and trehalose, wherein the proanthocyanidin is contained in the sheet in a proportion of 250 to 300 mg/m$^2$ and the trehalose is contained in the sheet in a proportion of 5 g/m$^2$.

10. The method according to claim 9, wherein the method achieves delay in a progression of decay of the fruit or vegetable wrapped in the taste-adjusting material.

\* \* \* \* \*